United States Patent [19]

Moller

[11] Patent Number: 5,110,521
[45] Date of Patent: May 5, 1992

[54] HYBRID APPARATUS AND METHOD FOR BLENDING MATERIALS

[75] Inventor: Richard W. Moller, Fenton, Mich.

[73] Assignee: Hydreclaim Corporation, Fenton, Mich.

[21] Appl. No.: 568,784

[22] Filed: Aug. 17, 1990

[51] Int. Cl.$^5$ .................... B29B 7/28; B29C 47/92
[52] U.S. Cl. .................... 264/40.4; 222/55;
222/57; 264/40.7; 264/73; 264/211; 264/349;
364/479; 366/79; 366/98; 366/141; 366/152;
366/155; 366/160; 366/318; 425/140; 425/148;
425/204
[58] Field of Search ............ 264/40.1, 40.4, 40.7,
264/73, 211, 349; 425/135, 140, 145, 148, 204,
205; 222/1, 55, 56, 57, 58, 77; 364/479, 564,
567, 568, 571.01; 366/79, 98, 141, 142, 151, 152,
155, 160, 182, 318

[56] References Cited

U.S. PATENT DOCUMENTS

| | | |
|---|---|---|
| 3,892,390 | 7/1975 | Eauclaire . |
| 4,013,745 | 3/1977 | Brinkmann et al. ............ 264/40.4 X |
| 4,209,476 | 6/1980 | Harris ................................. 264/40.4 |
| 4,443,109 | 4/1984 | Watts ................................. 366/134 |
| 4,561,781 | 12/1985 | Seymour ........................... 366/132 |
| 4,663,103 | 5/1987 | McCullough et al. ............ 264/40.4 |
| 4,759,633 | 7/1988 | Schmid .............................. 366/156 |
| 4,961,887 | 10/1990 | Crumpler et al. ................ 264/40.4 |

OTHER PUBLICATIONS

Ricciardi, R. et al., "Dry-Solids Metering: Gravimetric Feeders", *Plastics Technology*, Sep. 1976, pp. 61-67.

*Primary Examiner*—Leo B. Tentoni
*Attorney, Agent, or Firm*—Learman & McCulloch

[57] ABSTRACT

A blender for plastic materials weighs a charge of virgin plastic pellets as they are added to a hopper, similarly weighs plastics regrind material as it is added to the hopper, calculates the weight of color material (or other additive) on the basis of the actual virgin material weight and the desired color percentage, calculates from the weight of color material and a calibration of a volumetric feeder the volumetric amount of color material needed and then dispenses the calculated volume of color material. The apparatus is hybrid, using weight ratio measuring devices for the primary components and a volumetric feeder for dispensing the additives.

13 Claims, 4 Drawing Sheets

HYBRID APPARATUS AND METHOD FOR BLENDING MATERIALS

FIELD OF THE INVENTION

This invention relates to a method and apparatus for proportionately measuring and blending particulate materials.

BACKGROUND OF THE INVENTION

In the plastic molding industry it is a common practice to use virgin pellets of polymer resin to make a product and to uniformly blend a color additive with the pellets before molding and in just the right proportion to obtain the desired color of the product. Accurate control of the color is imperative so that similar or different molded products molded at different times will match if used together. For this purpose the amount of color additive is specified as a percentage of the virgin material. Whenever a molded part is imperfect, it is ground up and the resulting "regrind" material is mixed with virgin material to make another product of the same color as the regrind material. In this case the percentage of color additive is still based on the amount of virgin pellets and not on the total batch size.

Two standard ways of supplying components to a blender or mixer in the desired proportion are by weight ratio and by volume ratio. In either case the amounts of virgin material and regrind are determined and the required amount of color additive is calculated. In the case of weight ratio mixing, each of the three components is weighed out and then mixed together. This is done, for example, by vacuum conveying each component to a hopper, constantly weighing the hopper, and shutting off the material supply when the correct amount of the respective material has been received. Color or other additives which comprise a relatively small portion of the whole batch may be weighed separately and then added to the batch. With this system some overrun of each of the materials is possible as a consequence of which the resulting ratio of the virgin material to color may differ from the specified ratio.

Volumetric supply of materials is usually carried out by auger conveyors which carry each component to the mixer. A pickup coupled to each auger motor generates a certain number of counts per auger revolution. By calibrating an auger for use with a given material the number of counts per unit volume of material is determined. The desired amount of each component is predetermined, the amounts are expressed in terms of counts, and the auger for each component is run for the respective number of counts. This should give the correct amount of each component, provided the density of each remains consistent after calibration and that any overrun which occurs is also consistent. However the opportunity for errors is present.

SUMMARY OF THE INVENTION

It is a main object of the invention to provide a method and apparatus for accurately determining the amount of a major constituent of a mixture and then calculating and supplying the correct proportional amount of additive. A further object of the invention is to carry out the main object by taking advantage of the best characteristics of both the weight and volumetric systems.

The invention is carried out in a blending system for proportionately combining materials, the method of accurately volumetrically feeding an additive in a weight proportion to a primary component comprising the steps of: calibrating a volumetric feed to determine the ratio of weight of additive per volumetric unit; selecting an additive portion as a percentage of a primary component; loading a charge of a primary component and weighing the charge; calculating the required weight of additive from the selected percentage and the weight of the primary component; calculating the required volumetric units of additive from the required weight of additive and the calibrated ratio; and feeding the calculated volumetric units of additive, whereby the amount of additive, by weight, will correspond to a predetermined precise proportion of the actual weight of the primary component.

The invention is also carried out by apparatus for blending resin materials for a molding operation comprising: a mixing chamber for blending resin materials, a hopper for the virgin and regrind materials, means including a load cell for determining the weight of the hopper contents, the hopper having means for discharging its contents to the mixing chamber, means for feeding at least one component to the hopper and for terminating the feeding when the desired weight of the component has accumulated in the hopper, volumetric feeding means in communication with the mixing chamber for supplying an additive to the mixing chamber, and means coupled to the load cell and to the volumetric feeding means for controlling the amount of additive supplied as a proportion of the weight of hopper contents.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
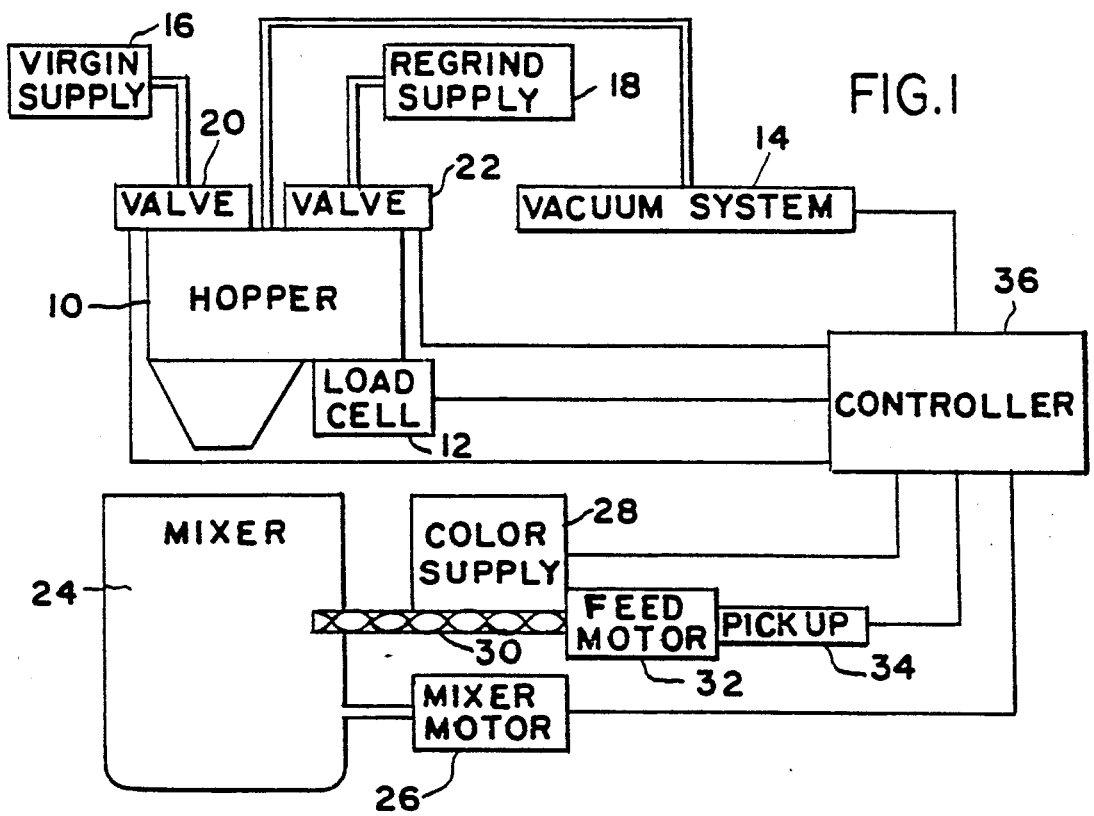
FIG. 1 is a block diagram of a system for proportional blending of components according to the invention.

FIG. 1 schematically illustrates apparatus for combining constituents of a mixture according to desired ratios. In particular, the apparatus is specifically designed for use with polymer resins for molding operations where virgin resin pellets and regrind material made from rejected moldings and other scrap are blended together and color and other additives are admixed under computer control according to precise ratios for accurate color results. The particular method for accurately supplying color or other additive material is still applicable even when only virgin material is used. It will be recognized that the art of blending plastic material is not the only area where the principles of the invention are applicable.

A weigh hopper 10 is supported by a load cell 12 and is connected by a hose to a vacuum system 14. A supply 16 of virgin pellets and a supply 18 of regrind material are connected by hoses to the hopper through valves 20 and 22 respectively. A mixer 24 defines a chamber for receiving material discharged from the hopper 10 and has an agitator driven by a motor 26. From a color additive supply 28 a quantity of color additive is extracted and fed to the mixer 24 by an auger 30 driven by a feed motor 32 equipped with a rotation pickup 34. A microprocessor based controller 36 is electrically connected to the load cell 12 and the pickup 34 to receive weight and feed data, and is connected to the vacuum system 14, the valves 20, 22, the feed motor 32 and the mixer motor 26 to control those elements.

Figure 2:
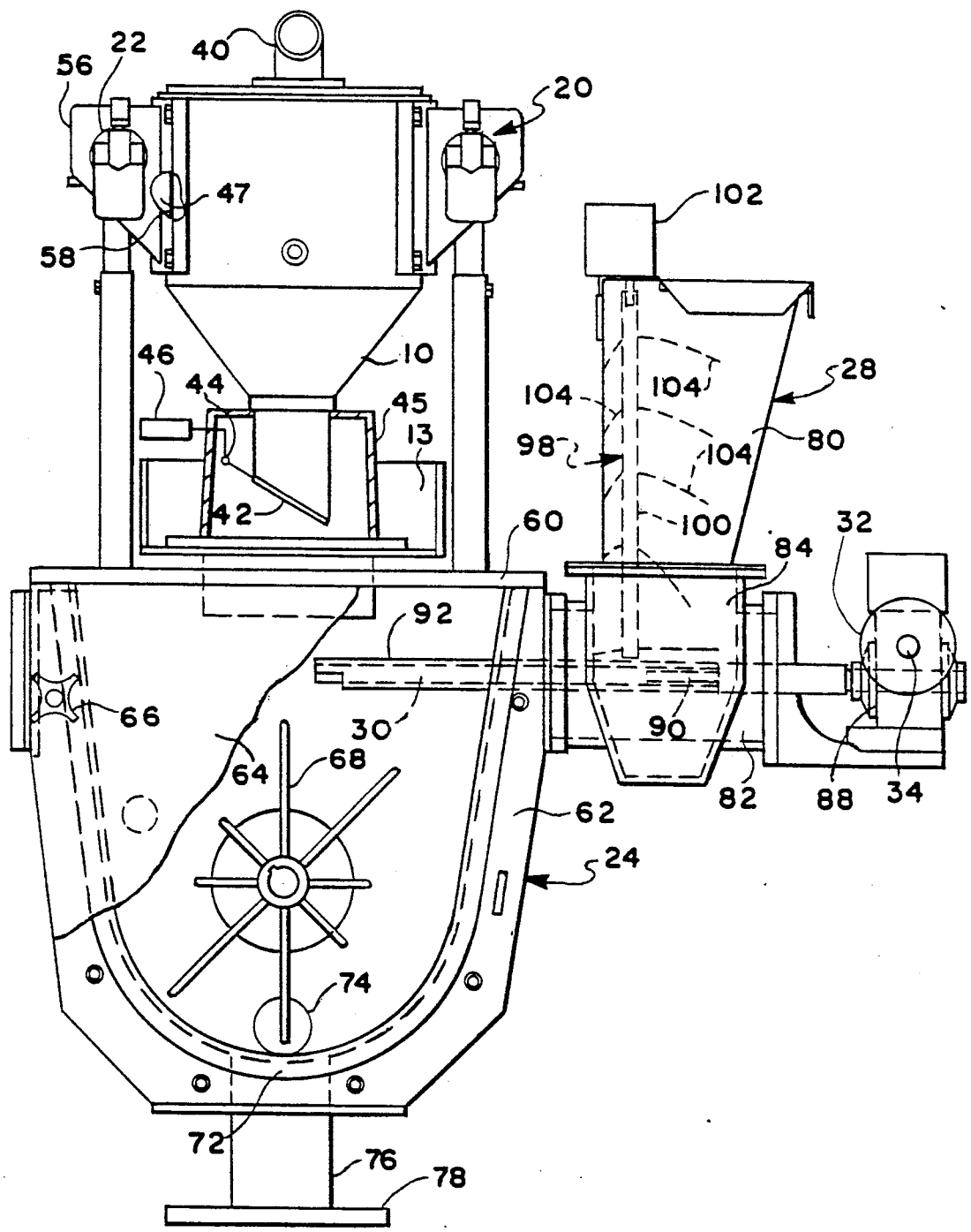
FIGS. 2 and 3 are front and side elevation views of proportioning and mixing apparatus according to the invention.
Figure 3:
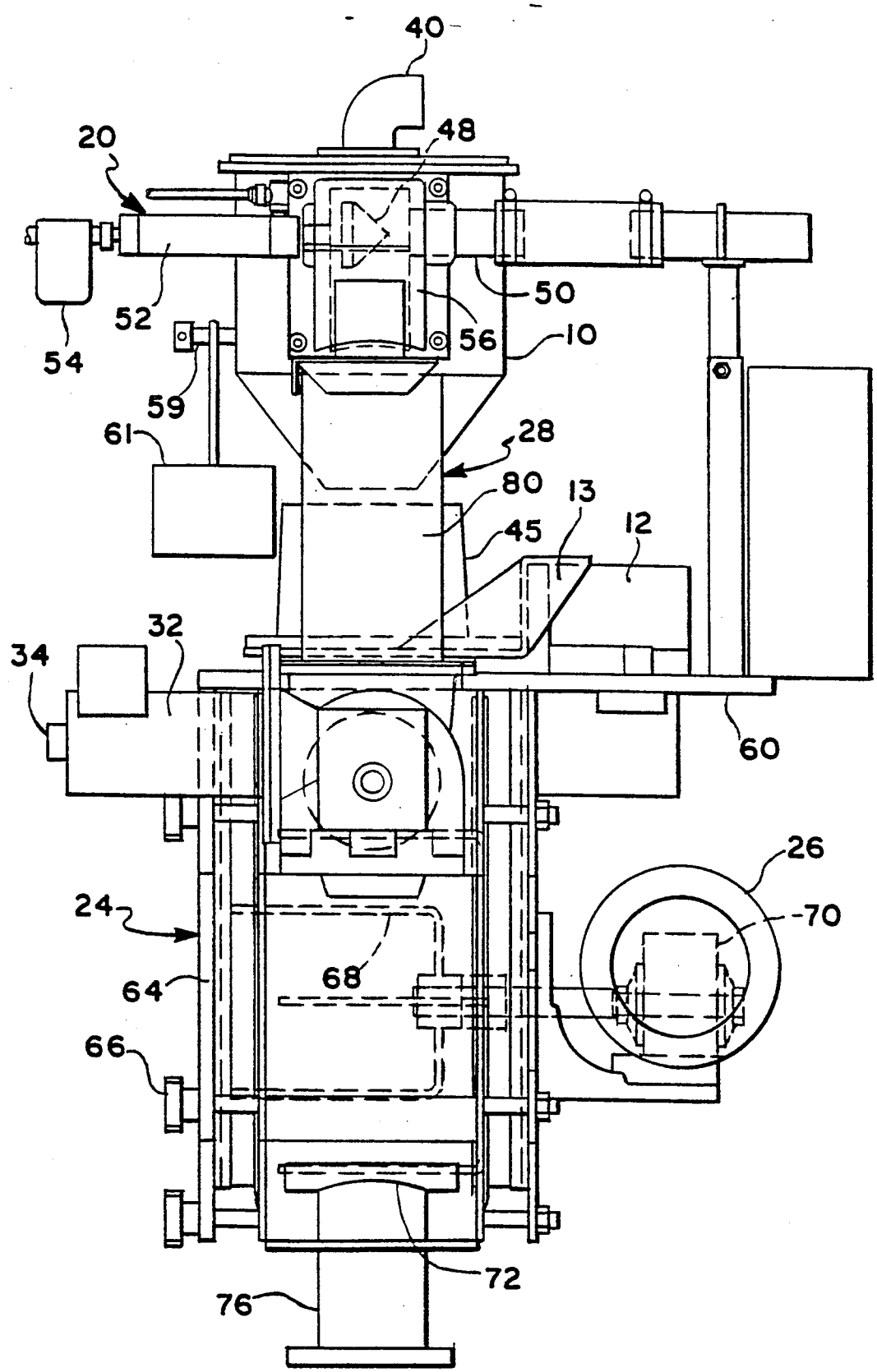

The weigh hopper and mixer and the color supply apparatus are better shown in FIGS. 2 and 3. The hopper 10 has a vacuum connection 40 on its top and a flap closure 42 on its bottom. The flap closure 42 is pivoted about an axis 44 and is balanced by a counterweight 46. As long as vacuum is applied to the hopper, the closure 42 is held shut to retain the hopper 10 contents, but when vacuum is released, the weight of the contents forces the closure open to effect discharge through a discharge chute 45 into the mixer 24. Virgin and regrind material are vacuum conveyed to the hopper 10 through openings 47 in the sides of the hopper when the valves 20, 22 are open. Each valve comprises a conical stopper 48 which selectively closes the end of a conveyor tube 50. Each valve stopper 48 is operated by an air actuator 52 which is controlled by a solenoid 54. Each valve is covered by a shroud 56 which engages a seal 58 around the respective opening 47. The entire hopper assembly is supported on a platform 60 through the load cell 12 and a bracket 13 which mounts the hopper in cantilever fashion for weighing the hopper and its contents. A hanger 59 projecting from the side of the hopper 10 is used to hold a sample holder 61 for weighing a sample of color additive.

The mixer 24 comprises a housing 62 defining a mixing chamber mounted just below the platform 60 and has an open top to receive the discharge from the weigh hopper 10. A transparent cover 64 on the front of the housing allows observation of the mixing process and is held in place by star knobs 66. The mixer motor 26 drives a mixing agitator 68 through a gear reducer 70. A discharge opening 72 at the bottom of the housing is controlled by an expandable plug 74 and is coupled through a discharge pipe 76 to a mount 78 which may be secured to a molding machine or other apparatus.

Figure 5:
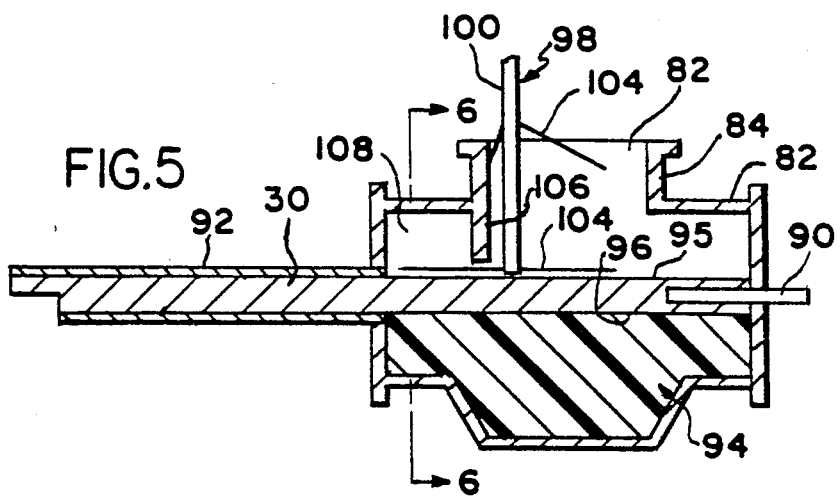
FIG. 5 is a cross-sectional view of an additive feeder according to an embodiment of the invention.
Figure 6:
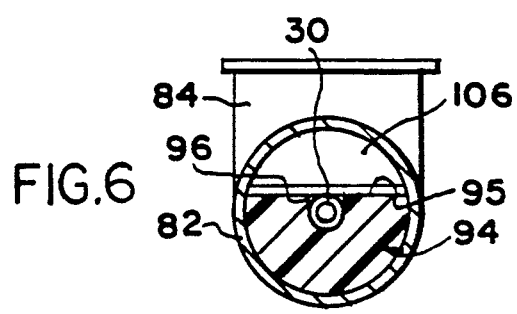
FIG. 6 is a view of the feeder of FIG. 5 taken along line 6—6 of FIG. 5.

The additive feeder 28 is attached to one side of the mixer 24. (If desired, a second feeder may be attached to the other side of the mixer.) The feeder 28 comprises a hopper 80 having an outlet at its lower end in communication with a cylindrical horizontal or receiver feed chamber 82 via a vertical cylindrical inlet 84 supporting the hopper 80, and a rotatable auger 30 extending horizontally through the feed chamber and into the mixer 24. The auger 30 is preferably an open helix driven by a feeder motor 32 through a gear reducer 88. An output shaft 90 of the gear reducer 88 fits within one end of the auger to drive the auger. The auger rotation is monitored by a Hall effect pickup 34 on the motor 32. Depending on the pickup design and the gear reducer 88 ratio, the pickup may generate, say, 50 or 100 counts per auger revolution. A tubular housing 92 around the auger 30 extends into and communicates with the mixing chamber and terminates in a discharge opening in the mixer. An insert 94, best shown in FIGS. 5 and 6, fills the bottom of the feed chamber 82 and has an upper surface 95 at the level of the top of the auger 30 and forming a trough 96 aligned with the tubular housing 92 for receiving the auger. An agitator 98 in the hopper 80 comprises a vertical shaft 100 driven about its axis by a motor 102 mounted atop the hopper 80. Several flexible cables 104 attached to the shaft along its length pass through the hopper contents as the shaft turns to stir the contents and assist in a free flow to the auger.

When color or other additive is used in the form of pellets the material readily feeds into the trough 96 for advancement into the mixer 24 by the auger. In the case of powder, a special feature helps in uniformity of feed into the trough 96. A vertical baffle or partition 106 adjacent the chamber 82 extends downwardly to a level above the insert 94 and is spaced from the insert by ¼ inch or to define an auxiliary or supplemental chamber 108 in the outlet end of the feed main chamber 82 which is free from the weight of the hopper contents. The bottom cable 104 of the agitator 98 extends under the baffle 106 to stir the powder in the separate chamber 108 and to sweep some powder into that chamber 108. The action of the agitator in that chamber 108 helps to fill in the trough for more uniform auger delivery than is accomplished in the absence of the separate chamber 108.

Figure 4:
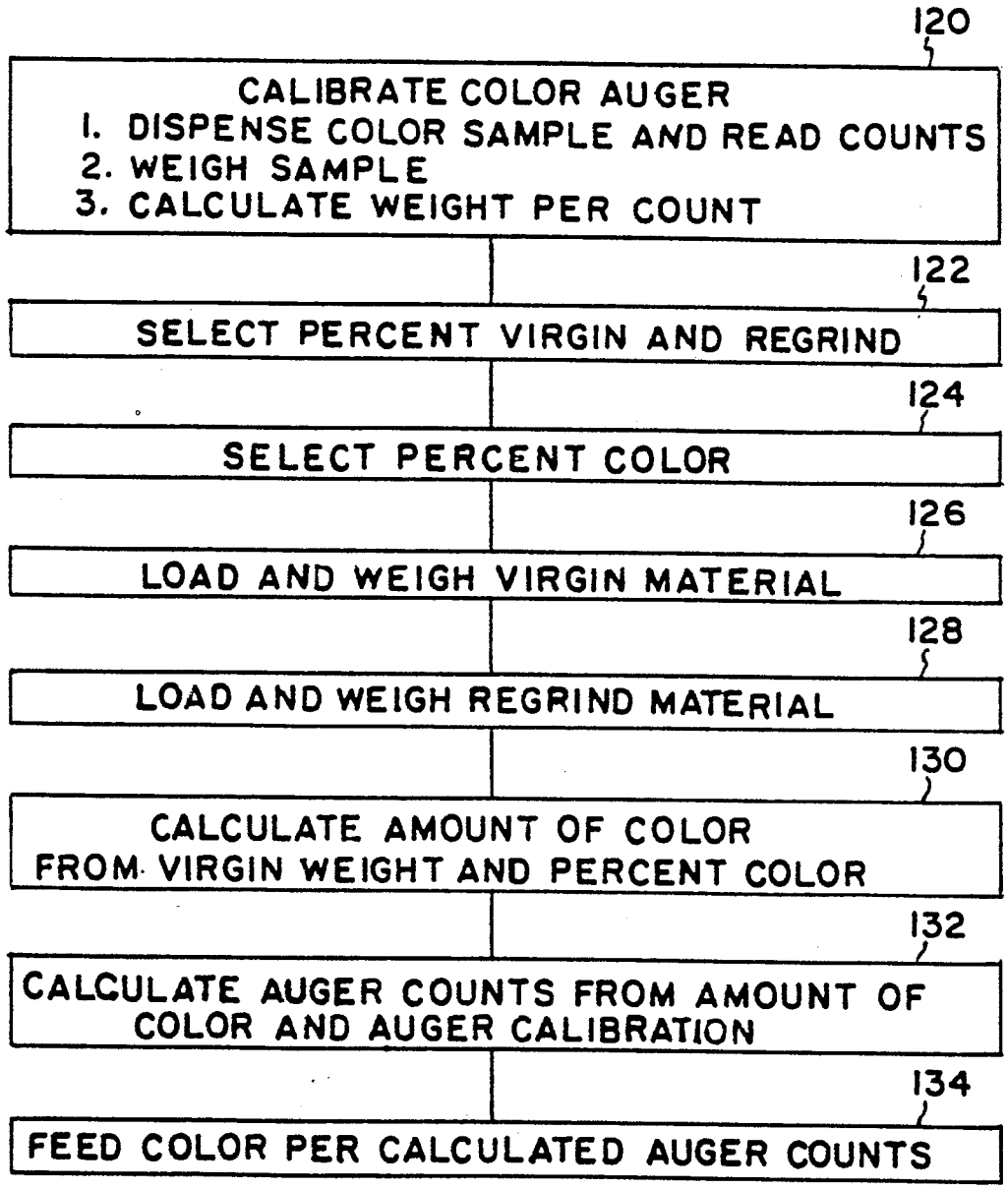
FIG. 4 is a flow chart illustrating the program of the controller of FIG. 1 in accordance with the method of the invention.

The microprocessor based controller 36 is programmed to control the apparatus to perform specific functions as illustrated in the chart of FIG. 4. The operator is required to enter certain information such as the desired batch size and the selection of the percentage of virgin and regrind and percentage of color based on the weight of virgin material. The first step shown in block 120 is to calibrate the color feeder 34. This entails determining the number of pickup counts for a given weight of material. The sample holder 61 is first hung on the hanger 59 and weighed to determine its tare weight and then a typical additive amount is extracted by the auger and dispensed into the sample holder and the pickup counts are counted. The sample is weighed by returning the sample holder to the hanger 59. The controller calculates the weight of additive per count and this value is stored. Then in step 122 the operator enters the percent virgin and regrind materials, and in step 124 the percent additive (color) is chosen. With the information entered, the controller handles the remainder of the steps. In step 126 the virgin material is loaded by the vacuum conveyor system by opening the valve 20 and continuously monitoring the weight increase of the hopper by the load cell 12. When the selected amount of virgin material is sensed by the load cell the valve 20 is closed. It is possible that a small overrun may occur but the controller stores the final weight of the virgin material. In step 128 the regrind material is loaded and weighed in the same manner as the virgin material. Then in step 130 the desired amount of color or other additive is calculated from the selected percent and the actual amount of virgin material. In step 132 the number of auger pickup counts needed to feed the desired amount of additive is calculated making use of the calibration results. Finally, in step 134, the additive is extracted from the supply thereof and to the mixer 24 for the calculated number of counts and, at the same time, the contents of the weigh hopper 10 are discharged into the mixer.

For a batch size of 10 pounds, for example, and a 70%–30% ratio of virgin and regrind material, 7 pounds is the target value of the virgin charge. If the actual charge is 7.1 pounds, the color calculation will be based on that so that the color intensity is not diminished by the overrun. This provides greater accuracy than the prior method of calculating the additive based on the target value rather than the actual charge weight. In addition, the precision metering of the additive by auger count is not susceptible to overrun and adds to the accuracy of the method.

The embodiments of the invention in which an exclusive property or privilege is claimed are defined as follows:

1. A method of blending a plurality of materials comprising:
    (a) introducing a quantity of a first material from a source thereof to a container;
    (b) weighing said first material in said container;
    (c) introducing a quantity of a second material to said container;
    (d) calculating a quantity of a third material that is required to be combined with said first material to produce a selected weight ratio of said first and third materials only;
    (e) dispensing to a mixing chamber a quantity of said third material corresponding to the quantity calculated in step (d);
    (f) discharging said first and second materials from said container to said mixing chamber; and
    (g) mixing said first, second, and third materials in said mixing chamber.

2. The method according to claim 1 wherein said first, second, and third materials are discharged to said mixing chamber simultaneously.

3. The method according to claim 2 wherein said mixing of said first, second, and third materials occurs as said materials are discharged to said mixing chamber.

4. The method according to claim 1 wherein said first material comprises virgin plastic material, said second material comprises regrind plastic material, and said third material comprises a color additive material.

5. The method according to claim 4 wherein said second material is colored and wherein said color additive third material has a color corresponding to that of said second material.

6. A method of batch blending a plurality of materials comprising:
    (a) introducing a quantity of a first material from a source thereof to a container;
    (b) measuring the weight of said first material in said container;
    (c) introducing a quantity of at least one other material to said container;
    (d) calculating that quantity of an additive material that is required to be combined with the quantity of only said first material in said container to produce a predetermined weight ratio of said first and additive materials in the combination thereof;
    (e) extracting from a source of said additive material a quantity thereof corresponding to the quantity calculated in step (d);
    (f) introducing into a mixing chamber all of said materials; and
    (g) mixing all of said materials in said mixing chamber.

7. The method according to claim 6 wherein the mixing of said first and additive materials occurs as said first and additive materials are introduced into said mixing chamber.

8. Apparatus for blending a plurality of blendable materials comprising:
    (a) a mixing chamber;
    (b) a container;
    (c) means for delivering a quantity of a first material from a source thereof to said container;
    (d) means for weighing the quantity of said first material in said container;
    (e) means for delivering a quantity of a second material from a source thereof to said container;
    (f) means for extracting from a source thereof a quantity of a third material corresponding to a predetermined percentage of the weight of said first material only in said container;
    (g) means for discharging said first and second materials from said container to said mixing chamber;
    (h) means for dispensing said extracted quantity of said third material to said mixing chamber; and
    (i) means in said mixing chamber for mixing said first, second, and third materials.

9. The apparatus according to claim 8 wherein the means for extracting said third material from said source thereof comprises a rotatable auger operable to extract a known quantity of said third material per selected unit of revolution of said auger, and means for counting each selected unit of revolution of said auger.

10. The apparatus according to claim 8 wherein the means for dispensing the extracted quantity of said third material comprises a hopper having an outlet at its lower end, a receiver underlying said outlet and having an inlet in communication with said outlet, means forming a trough in said receiver, rotatable auger means occupying said trough, said auger means having a discharge end in communication with said mixing chamber, and drive means coupled to said auger means for rotating the latter to discharge said third material from said trough into said mixing chamber.

11. The apparatus according to claim 10 wherein said receiver has a partition overlying said trough and forming an auxiliary chamber adjacent said inlet, said auger means extending through said auxiliary chamber.

12. The apparatus according to claim 11 including agitator means accommodated in said hopper for agitating the third material therein.

13. The apparatus according to claim 11 including agitator means accommodated in said hopper for agitating the third material therein, said agitating means including an agitating part extending into said auxiliary chamber.

* * * * *